(12) United States Patent
Kato (10) Patent No.: US 8,588,784 B2
(45) Date of Patent: Nov. 19, 2013

(54) MOBILE COMMUNICATION SYSTEM, WIRELESS BASE STATION AND HAND OVER RECONNECTION METHOD FOR USE THEREWITH INCLUDING AN ACCUMULATION PORTION FOR HOLDING DATA

(75) Inventor: Hidenori Kato, Tokyo (JP)

(73) Assignee: NEC Corporation, Tokyo (JP)

( * ) Notice: Subject to any disclaimer, the term of this patent is extended or adjusted under 35 U.S.C. 154(b) by 1333 days.

(21) Appl. No.: 11/905,838

(22) Filed: Oct. 4, 2007

(65) Prior Publication Data

US 2008/0102841 A1  May 1, 2008

(30) Foreign Application Priority Data

Nov. 1, 2006 (JP) .................. 2006-297218

(51) Int. Cl.
*H04W 36/00* (2009.01)
(52) U.S. Cl.
USPC ............ 455/438; 455/436; 370/331; 370/412
(58) Field of Classification Search
USPC .......... 455/436, 438, 439, 442; 370/329, 331, 370/335, 338, 340–342, 441
See application file for complete search history.

(56) References Cited

U.S. PATENT DOCUMENTS 7,567,535 B2  7/2009  Singh et al.
7,570,945 B2  8/2009  Lee et al.
2006/0198341 A1*  9/2006  Singh et al. .................. 370/331
2007/0293224 A1* 12/2007  Wang et al. .................. 455/436
2008/0254800 A1* 10/2008  Chun et al. .................. 455/438

FOREIGN PATENT DOCUMENTS

| JP | 2003-283510 |  | 10/2003 |
| JP | 2004-304325 |  | 10/2004 |
| JP | 2005-287074 |  | 10/2005 |
| JP | 2006-025421 | A | 1/2006 |
| JP | 2006-254438 | A | 9/2006 |

OTHER PUBLICATIONS

3GPP TRR3.018, "3rd Generation Partnership Project; Technical Specification Group Radio Access Network; Evolved UTRA and UTRAN; Radio Access Architecture and Interfaces (Release 7)", Vo.2.1, Apr. 2006.
Ericsson, "LTE Connected Mode Mobility", TSG-RAN WG3 #51, Tdoc R3-060209, Feb. 13-17, 2006.
Japanese Office Action issued on Aug. 23, 2011 with a partial English translation thereof.

* cited by examiner

*Primary Examiner* — Dwayne Bost
*Assistant Examiner* — Gerald Johnson
(74) *Attorney, Agent, or Firm* — McGinn IP Law Group, PLLC (57) ABSTRACT

The invention provides a mobile communication system capable of transferring data to be sent to mobile terminal equipment from one wireless base station to another during hand over, the wireless base station of a transfer source of the data including an accumulation portion that holds the data until the data normally arrives at the mobile terminal equipment.

19 Claims, 10 Drawing Sheets

MOBILE COMMUNICATION SYSTEM, WIRELESS BASE STATION AND HAND OVER RECONNECTION METHOD FOR USE THEREWITH INCLUDING AN ACCUMULATION PORTION FOR HOLDING DATA

INCORPORATION BY REFERENCE

This application is based upon and claims the benefit of priority from Japanese patent applications No. 2006-297218, filed on Nov. 1, 2006, the disclosure of which is incorporated herein its entirety by reference.

BACKGROUND OF THE INVENTION

1. Field of the Invention

The present invention relates to a mobile communication system, a wireless base station and a hand over reconnection method for use therewith, and more particularly to a hand over reconnection method without data loss in a third generation mobile communication system that is standardized by a standardization organization (3GPP: 3rd Generation Partnership Project).

2. Description of the Related Art

In the Release 7 of the 3GPP, as an evolved UTRAN [UMTS (Universal Mobile Telecommunications System) Terrestrial Radio Access Network], a network in which a wireless base station (NodeB) and a radio network controller (RNC: Radio Network Controller) are integrated is supposed and examined. In the following, an apparatus in which the wireless base station and the radio network controller are integrated is an integrated wireless base station (eNodeB: evolved UTRAN NodeB).

In a hand over procedure for the integrated wireless base station, a method for transferring the user data from one integrated wireless base station to another to prevent the loss of user data is resolved (e.g., refer to non-patent document 1 ("3rd Generation Partnership Project: Technical Specification Group Radio Access Network; Evolved UTRA and UTRAN; Radio Access Architecture and Interfaces (Release 7) 6.3.3.2.2 Option U-2) Forwarding Source eNodeB→Target eNodeB" [3GPP TR R3.018 V0.2.1 (2006-04)]).

However, since a delivery confirmation for user data is not made between the integrated wireless base stations, if the hand over fails due to a radio error halfway during the hand over procedure, a data loss occurs. In an NRT (Non Real Time) service, especially when a large volume of data is downloaded, it is required to retransmit the data from the beginning or perform a retransmission process on a TCP (Transmission Control Protocol) layer, if there is a data loss even though a reconnection process is successful, so that a large load is imposed on the radio network.

Accordingly, in the NRT service, though some delay is permitted, it is preferable that the data loss is as small as possible. Even if the hand over fails, especially in passing through a tunnel while moving at high speed, the communication can be resumed without loss of user data if the reconnection process is successful after passing through the tunnel.

In the hand over procedure at the wireless base station, the methods for buffering the user data to mobile terminal equipment at the wireless base station have been proposed (e.g., refer to patent documents 1-3 (Japanese patent application No. 2003-283510, Japanese patent application No. 2004-304325, and Japanese patent application No. 2005-287074)). With these methods, since the delivery confirmation for user data is not made, data is lost if the hand over fails due to a radio error halfway during the hand over procedure.

In the hand over procedure for the integrated wireless base station examined by the 3GPP, it is decided that the user data is transferred from one integrated wireless base station to another to prevent the loss of user data. However, since the delivery confirmation for user data is not made between the integrated wireless base stations, data is lost if the hand over fails due to a radio error halfway during the hand over procedure.

In an NRT service, especially when a large amount of data is downloaded, it is required to retransmit the data from the beginning or perform a retransmission process on the TCP layer, when there is a data loss even though a reconnection process is successful, so that a large load is imposed on the radio network. Accordingly, it is considered that some delay is permitted in the NRT service but the data loss is preferably as small as possible.

SUMMARY

Thus, an exemplary object of the invention is to solve the above-mentioned problems, and to provide a mobile communication system, a wireless base station and a hand over reconnection method for use therewith in which the communication can be resumed without losing the user data, when a reconnection process is performed again after a hand over failure or a reconnection failure.

An exemplary aspect of the invention is a mobile communication system capable of transferring data to be sent to mobile terminal equipment from one wireless base station to another during hand over, the wireless base station of a transfer source of the data including: an accumulation portion that holds the data until the data normally arrives at the mobile terminal equipment.

Another exemplary aspect of the invention is a wireless base station capable of transferring data to be sent to mobile terminal equipment to another wireless base station during hand over, including: an accumulation portion that holds the data until the data normally arrives at the mobile terminal equipment in transferring the data to another wireless base station.

Another exemplary aspect of the invention is a hand over reconnection method for use in a mobile communication system capable of transferring data to be sent to mobile terminal equipment from one wireless base station to another during hand over, including: holding the data in an accumulation portion by the wireless base station of a transfer source of the data until the data normally arrives at the mobile terminal equipment.

EXEMPLARY EMBODIMENT

An exemplary aspect of the invention is a mobile communication system having means of sharing the error information on the wireless among plural integrated wireless base stations by reflecting the error information on the wireless in transferring the user data from one integrated wireless base station {eNodeB: evolved UTRAN [UMTS (Universal Mobile Telecommunications System) Terrestrial Radio Access Network] NodeB} to another, whereby the communication can be continued without losing the user data, if a reconnection procedure is successful within a certain period of time even though the hand over procedure fails.

Herein, the integrated wireless base station is the apparatus in which a wireless base station (NodeB) and a radio controller (RNC: Radio Network Controller) are integrated.

Another exemplary aspect of the invention is a mobile communication system including an integrated wireless base station having an ARQ (Automatic Repeat Request: automatic retransmission control) function of recovering from an error on the wireless to the mobile terminal equipment (UE: User Equipment), and a function of transferring the user data from one integrated wireless base station to another during hand over, in which the data transmission is realized without loss of user data at the time of reconnection after a hand over failure by linking the data transfer on the wire from one integrated wireless base station to another with an error on the wireless.

More specifically, another exemplary aspect of the invention is a mobile communication system including an integrated wireless base station on the source (Source) side, which holds the user data without discarding it until the user data transferred from the integrated wireless base station on the source side to the integrated wireless base station on the target side normally arrives from the integrated wireless base station on the target side to the mobile terminal equipment.

Also, another exemplary aspect of the invention is a mobile communication system including the integrated wireless base station on the target side, which receives a delivery confirmation response (normally, ACK: Acknowledgement, abnormally, NACK: Non-Acknowledgement) from the mobile terminal equipment and notifies the result to the integrated wireless base station on the source side, after transferring the user data transmitted from the integrated wireless base station on the source side to the mobile terminal equipment.

Further, another exemplary aspect of the invention is a mobile communication system, as a specific third feature of the invention, including the integrated wireless base station on the source side, which in accordance with ACK or NACK notified from the integrated wireless base station on the target side, releases the wireless resources after discarding the held user data upon ACK, or starts the timer for waiting for a reconnection request from the mobile terminal equipment or another integrated wireless base station after holding the user data without delivery confirmation upon NACK. The integrated wireless base station on the source side discards all the user data after the timer times out.

Furthermore, another exemplary aspect of the invention is a mobile communication system including the integrated wireless base station on the source side, which transmits the held user data upon a transfer request for the user data from another integrated wireless base station on the target side. The integrated wireless base station performs the above-mentioned process after transmitting the user data.

As described above, the integrated wireless base station has not only the ARQ function on the wireless intended for the mobile terminal equipment, but also the ARQ function on the wire intended for the integrated wireless base station, and holds the user data without arrival confirmation by the ARQ function on the wire in the accumulation portion by linking the error information of the ARQ function on the wireless with the ARQ function on the wire between the integrated wireless base stations, whereby the data transmission without loss of user data can be realized at the time of reconnection after the hand over failure.

Accordingly, another exemplary aspect of the invention is a mobile communication system wherein the error information on the wireless can be shared between the integrated wireless base stations by reflecting the error information on the wireless in transferring the user data from one integrated wireless base station to another, whereby the communication can be continued without losing the user data in the reconnection procedure after the hand over failure.

That is, another exemplary aspect of the invention is a mobile communication system, wherein when the user data transferred from one integrated wireless base station to another during hand over becomes an error on the wireless, the SN (Sequence Number) of a packet causing the error is notified from one integrated wireless base station to another, whereby the communication can be restarted without losing the user data at the time of reconnection after the hand over failure.

Also, another exemplary aspect of the invention is a mobile communication system, wherein the user data is held in the integrated wireless base station on the source side until the user data transferred from one integrated wireless base station to another during hand over arrives at the mobile terminal equipment, whereby even when the hand over failure or the reconnection failure is repeated, the communication can be restarted without losing the user data until the user data is discarded by the timer.

Figure 1:
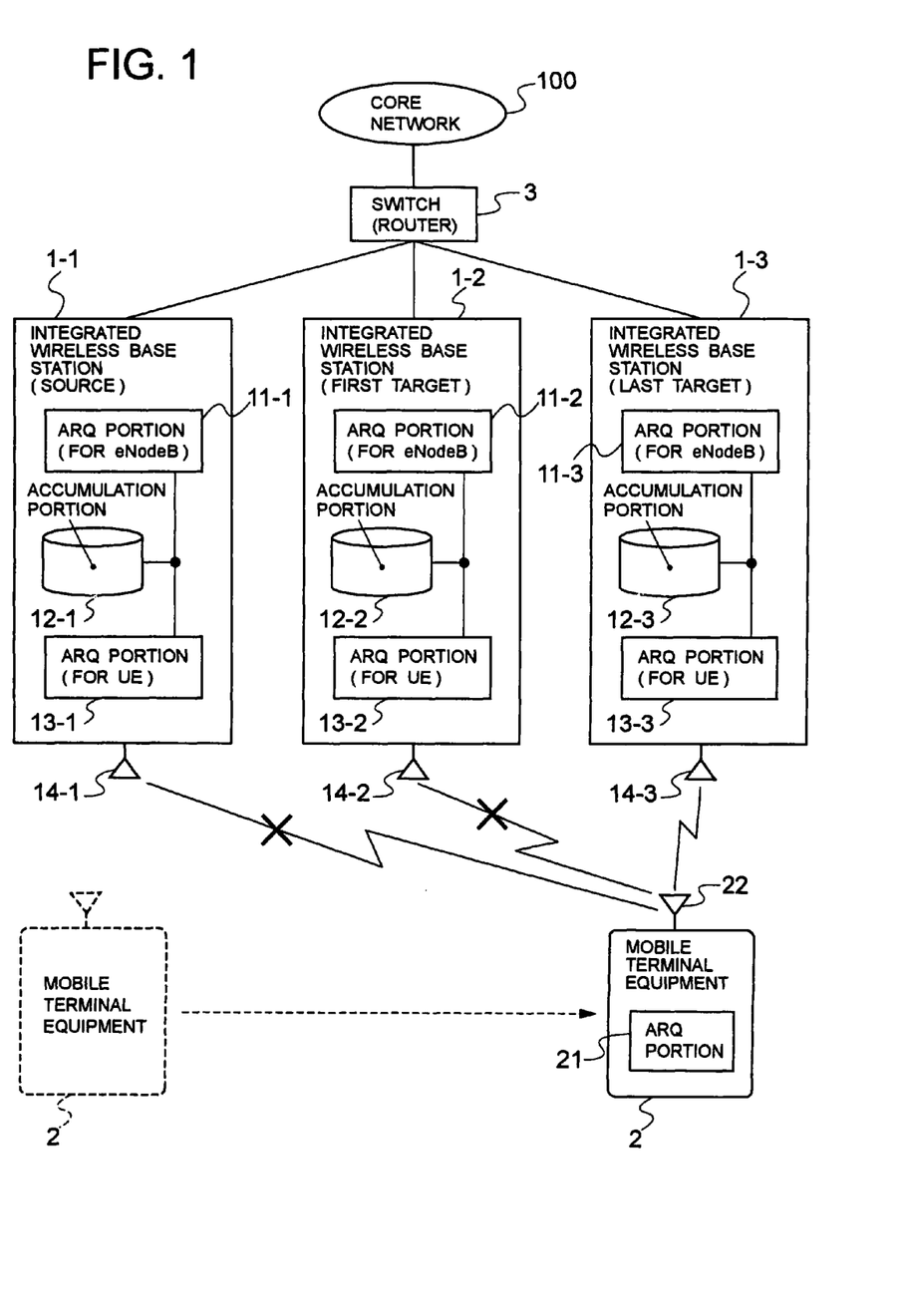
FIG. 1 is a block diagram showing the configuration of a mobile communication system according to an exemplary embodiment of the invention.

An exemplary embodiment of the invention will be described below with reference to the drawings. FIG. 1 is a block diagram showing the configuration of a mobile communication system according to an exemplary embodiment of the invention. In FIG. 1, the mobile communication system according to an exemplary embodiment of the invention includes an integrated wireless base station {eNodeB: evolved UTRAN [UMTS (Universal Mobile Telecommunications System) Terrestrial Radio Access Network] NodeB} 1-1 to 1-3, a mobile terminal equipment (UE: User Equipment) 2, a switch (router) 3, and a core network (CN: Core Network) 100.

The integrated wireless base stations 1-1 to 1-3 comprises ARQ (Automatic Repeat Request: automatic retransmission control) portions (for eNodeB) 11-1 to 11-3 on the wire between the integrated wireless base stations, accumulation portions 12-1 to 12-3 for holding the user data to the mobile terminal equipment 2, ARQ portions (for UE) 13-1 to 13-3 on the wireless intended for the mobile terminal equipment 2, and antennas 14-1 to 14-3. The mobile terminal equipment 2 comprises an ARQ portion 21 and an antenna 22. The integrated wireless base stations 1-1 to 1-3 are the apparatus in which the wireless base station (NodeB) and the radio network controller (RNC: Radio Network Controller) are integrated.

Also, the integrated wireless base station 1-1 is the integrated wireless base station on the source (Source) side that originally communicates with the mobile terminal equipment 2, the integrated wireless base station 1-2 is the integrated wireless base station on the target (First Target) side to make the first hand over, and the integrated wireless base station 1-3 is the integrated wireless base station on the target (Last Target) side to make the last reconnection when the hand over fails.

Further, in this embodiment, the transmission unit of a user packet transmitted or received between the integrated wireless base stations is an SDU (Service Data Unit), and the transmission unit of a user packet transmitted or received between the integrated wireless base station and the mobile terminal equipment is a PDU (Protocol Data Unit). The PDU is the transmission unit on the wireless divided from the SDU. Since any one of the integrated wireless base stations 1-1 to 1-3 can be a source (Source), target (First Target) or target (Last Target) depending on a moving direction of the mobile terminal equipment, all the integrated wireless base stations 1-1 to 1-3 have actually the same functions.

Figure 2:
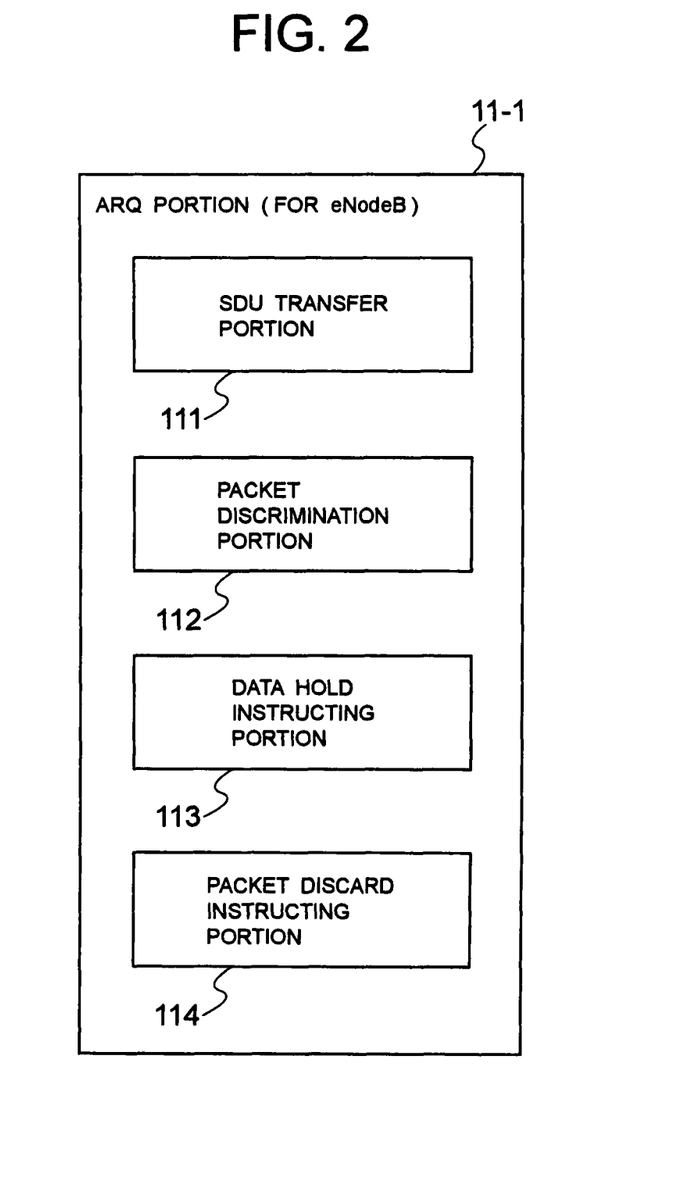
FIG. 2 is a block diagram showing a configuration example of an ARQ portion 11-1 intended for an integrated wireless base station within the integrated wireless base station 1-1 of FIG. 1.

FIG. 2 is a block diagram showing a configuration example of the ARQ portion 11-1 intended for the integrated wireless base station within the integrated wireless base station 1-1 of FIG. 1. In FIG. 2, the ARQ portion 11-1 intended for the integrated wireless base station within the integrated wireless base station 1-1 includes an SDU transfer portion 111 for transferring the user data to another integrated wireless base station 1-2 in an SDU unit, a packet discrimination portion 112 for discriminating the failed transmission packet by appending the SN (Sequence Number) to each data packet of SDU that is transferred and receiving a delivery result response (OK/NG) transmitted from the ARQ portion 11-2 intended for the integrated wireless base station in the integrated wireless base station 1-2, a data hold instruction portion 113 for instructing the accumulation portion 12-1 to discard the data if the delivery result response is OK, or instructing the accumulation portion 12-1 to hold the data if the delivery result response is NG, and a packet discard instruction portion 114 for instructing the accumulation portion 12-1 to discard the packet held in the accumulation portion 12-1 after the passage of a certain time.

Figure 3:
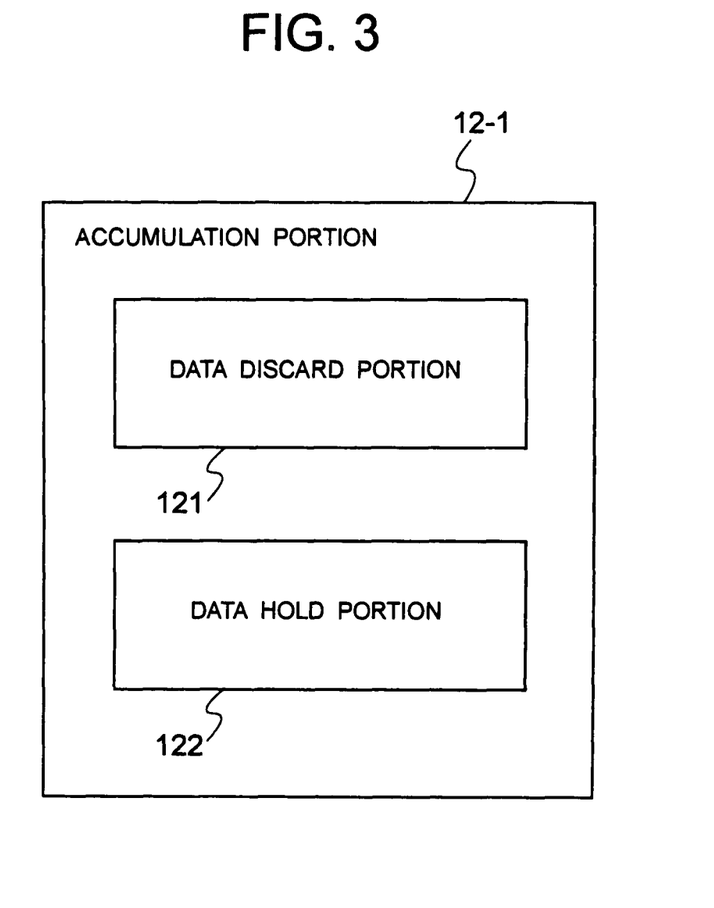
FIG. 3 is a block diagram showing a configuration example of an accumulation portion 12-1 within the integrated wireless base station 1-1 of FIG. 1.

FIG. 3 is a block diagram showing a configuration example of the accumulation portion 12-1 within the integrated wireless base station 1-1 of FIG. 1. In FIG. 3, the accumulation portion 12-1 within the integrated wireless base station 1-1 includes a data discard portion 121 for discarding the data in a packet unit to which the SN is appended in accordance with an instruction from the ARQ portion 11-1 intended for the integrated wireless base station or the ARQ portion 13-1 intended for the mobile terminal equipment, and a data hold portion 122 for holding the data. The packet unit as referred to herein means the SDU unit if the instruction is from the ARQ portion 11-1 intended for the integrated wireless base station or the PDU unit if the instruction is from the ARQ portion 13-1 intended for the mobile terminal equipment.

Figure 4:
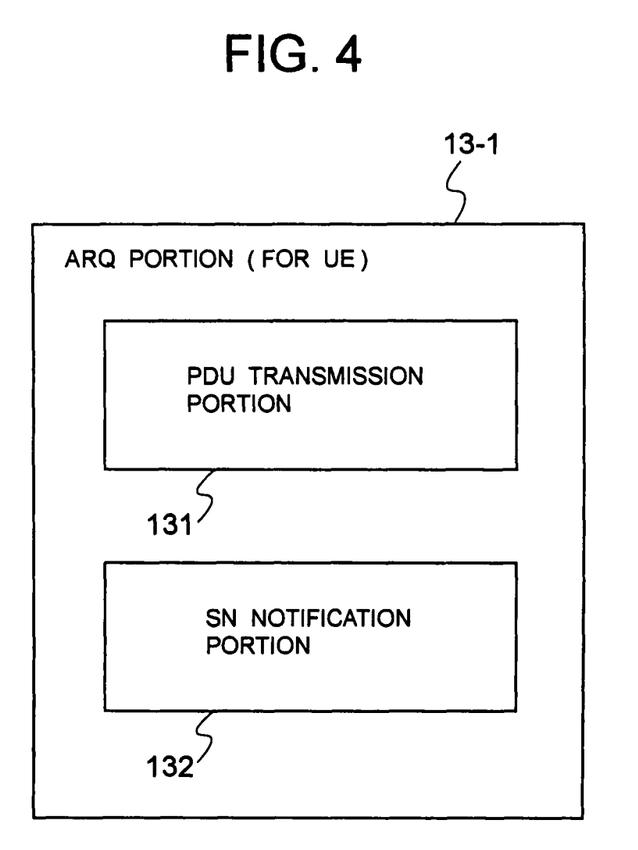
FIG. 4 is a block diagram showing a configuration example of an ARQ portion 13-1 intended for a mobile terminal equipment within the integrated wireless base station 1-1 of FIG. 1.

FIG. 4 is a block diagram showing a configuration example of the ARQ portion 13-1 intended for the mobile terminal equipment within the integrated wireless base station 1-1 of FIG. 1. In FIG. 4, the ARQ portion 13-1 intended for the mobile terminal equipment within the integrated wireless base station 1-1 includes a PDU transmission portion 131 for transmitting the PDU to the mobile terminal equipment 2 by appending the SN to the PDU, and an SN notification portion 132 for receiving a delivery confirmation response (ACK: Acknowledgement/NACK: Non-Acknowledgement) transmitted from the ARQ portion 21 of the mobile terminal equipment 2, repeating retransmission of the PDU with the SN to the mobile terminal equipment 2, and if it is discriminated that a transmission failure occurs, converting from the SN of the PDU without delivery confirmation to the SN of the SDU, and notifying the SN of the SDU to the ARQ portion 11-1 intended for the integrated wireless base station. The SN of the PDU and the SN of the SDU are managed as different values. The transfer of the PDU and SDU will be described later using FIG. 4.

Figure 5:
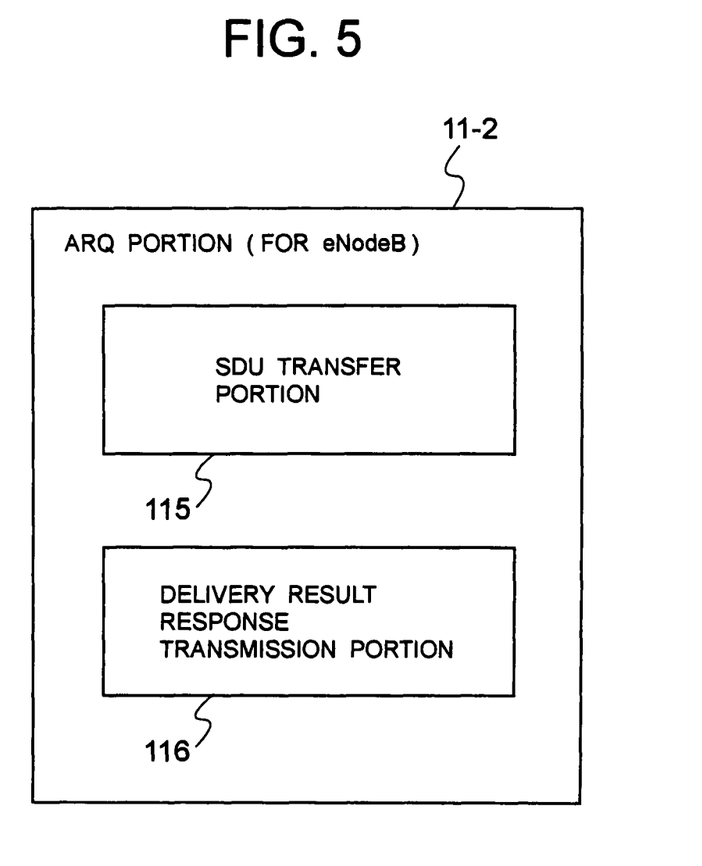
FIG. 5 is a block diagram showing a configuration example of an ARQ portion 11-2 intended for an integrated wireless base station within the integrated wireless base station 1-2 of FIG. 1.

FIG. 5 is a block diagram showing a configuration example of the ARQ portion 11-2 intended for the integrated wireless base station within the integrated wireless base station 1-2 of FIG. 1. In FIG. 5, the ARQ portion 11-2 intended for the integrated wireless base station within the integrated wireless base station 1-2 includes an SDU transfer portion 115 for receiving the user data of the SDU transferred from the ARQ portion 11-1 intended for the integrated wireless base station in another integrated wireless base station 1-1, and transferring the SDU to the ARQ portion 13-2 intended for the mobile terminal equipment, and a delivery result response transmission portion 116 for transmitting the delivery result response (OK/NG) to the ARQ portion 11-1 intended for the integrated wireless base station in the integrated wireless base station 1-1 by discriminating the delivery result notified from the ARQ portion 13-2 intended for the mobile terminal equipment.

The delivery result response (OK/NG) includes the SN of the SDU converted from the SN of the PDU that is the transmission NG between the integrated wireless base station 1-2 and the mobile terminal equipment 2. The accumulation portion 12-2 within the integrated wireless base station 1-2 has the same function as the accumulation portion 12-1 as shown in FIG. 3, and the explanation of its configuration and operation is omitted.

Figure 6:
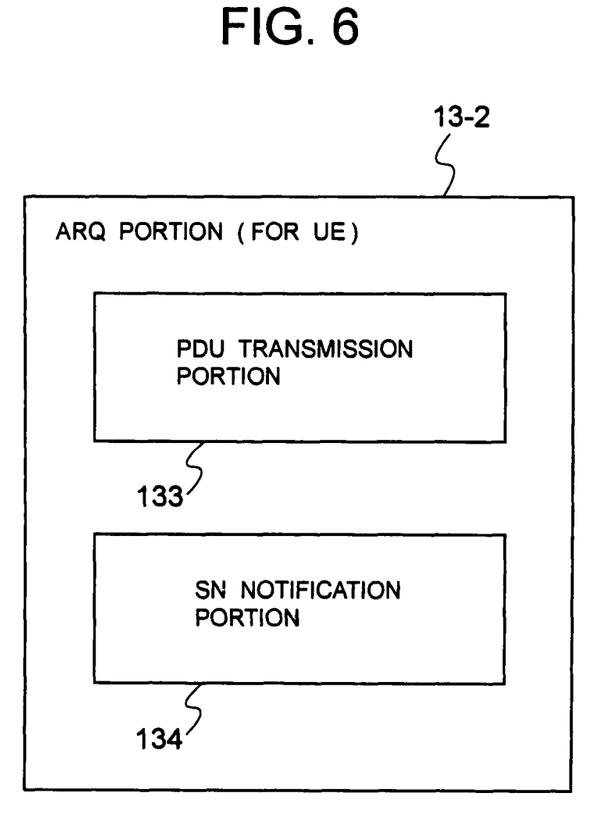
FIG. 6 is a block diagram showing a configuration example of an ARQ portion 13-2 intended for a mobile terminal equipment within the integrated wireless base station 1-2 of FIG. 1.

FIG. 6 is a block diagram showing a configuration example of an ARQ portion 13-2 intended for mobile terminal equipment within the integrated wireless base station 1-2 of FIG. 1. In FIG. 6, the ARQ portion 13-2 intended for the mobile terminal equipment within the integrated wireless base station 1-2 includes a PDU transmission portion 133 for transmitting the PDU to the mobile terminal equipment 2 by appending the SN to the PDU, and an SN notification portion 134 for receiving a delivery confirmation response (ACK/NACK) transmitted from the ARQ portion 21 of the mobile terminal equipment 2, repeating retransmission of the PDU with the SN to the mobile terminal equipment 2, and if it is discriminated that a transmission failure occurs, converting from the SN of the PDU without delivery confirmation to the SN of the SDU, and notifying the SN of the SDU to the ARQ portion 11-2 intended for the integrated wireless base station.

The functions of the ARQ portion 11-3 intended for the integrated wireless base station, the accumulation portion 12-3, and the ARQ portion 13-3 intended for the mobile terminal equipment within the integrated wireless base station 1-3 are the same as the integrated wireless base station 1-2 on the target (First Target) side, and the explanation of the configuration and operation is omitted.

Also, a core network 100 and a switch (router) 3 are well known to those skilled in the art, and not directly related with the present invention, and the detailed explanation of the configuration and operation is omitted.

Figure 7:
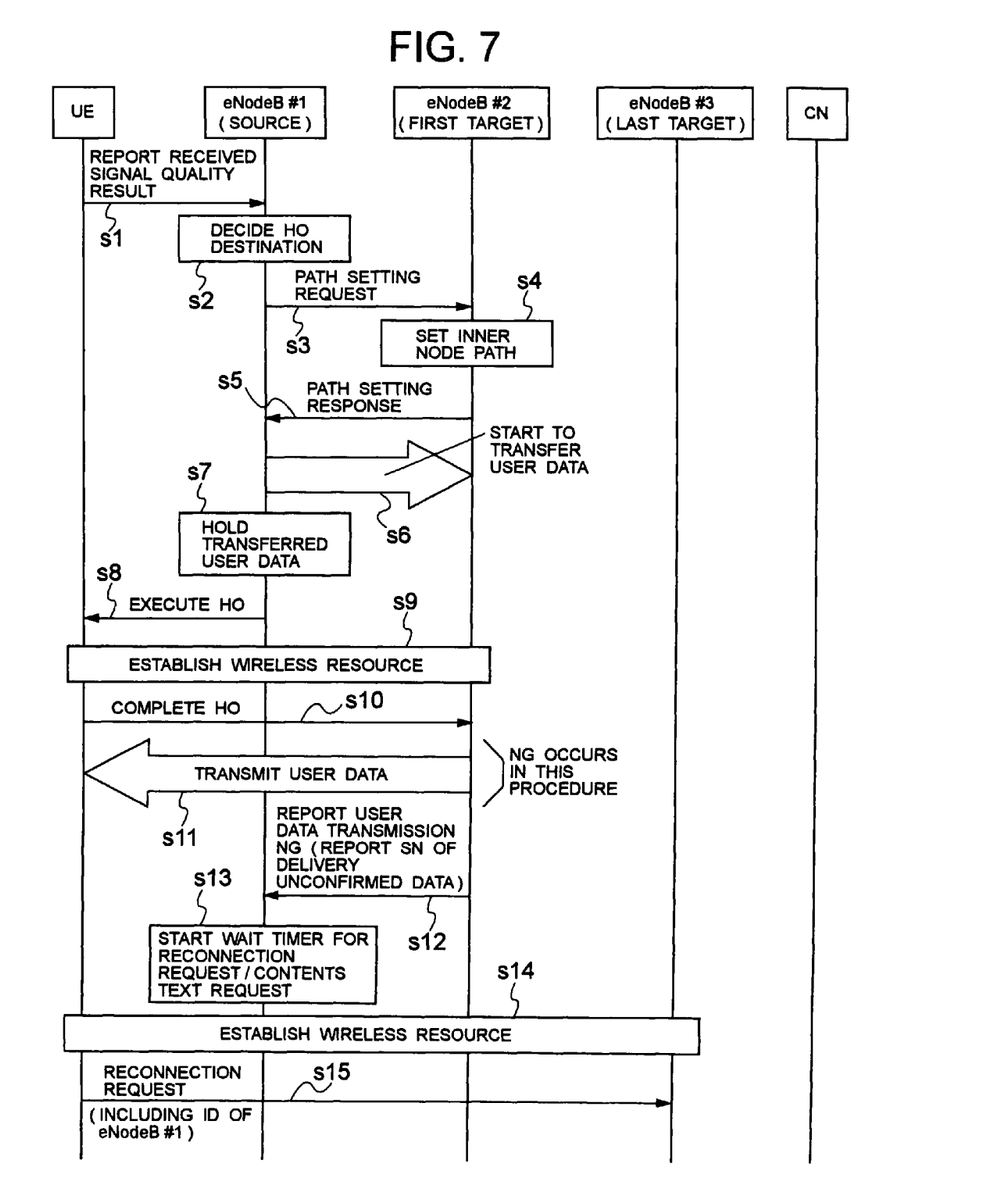
FIG. 7 is a sequence chart showing the operation of a mobile communication system according to an exemplary embodiment of the invention.
Figure 8:
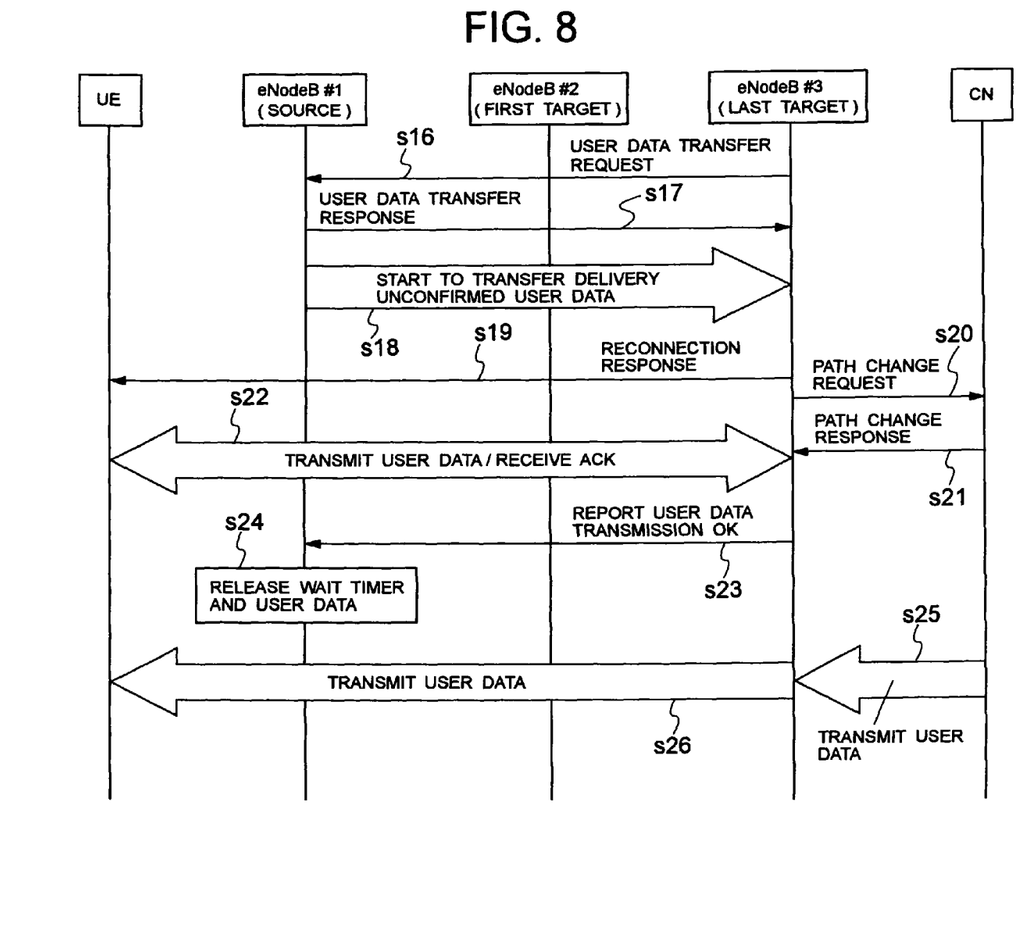
FIG. 8 is a sequence chart showing the operation of the mobile communication system according to an exemplary embodiment of the invention.
Figure 9:
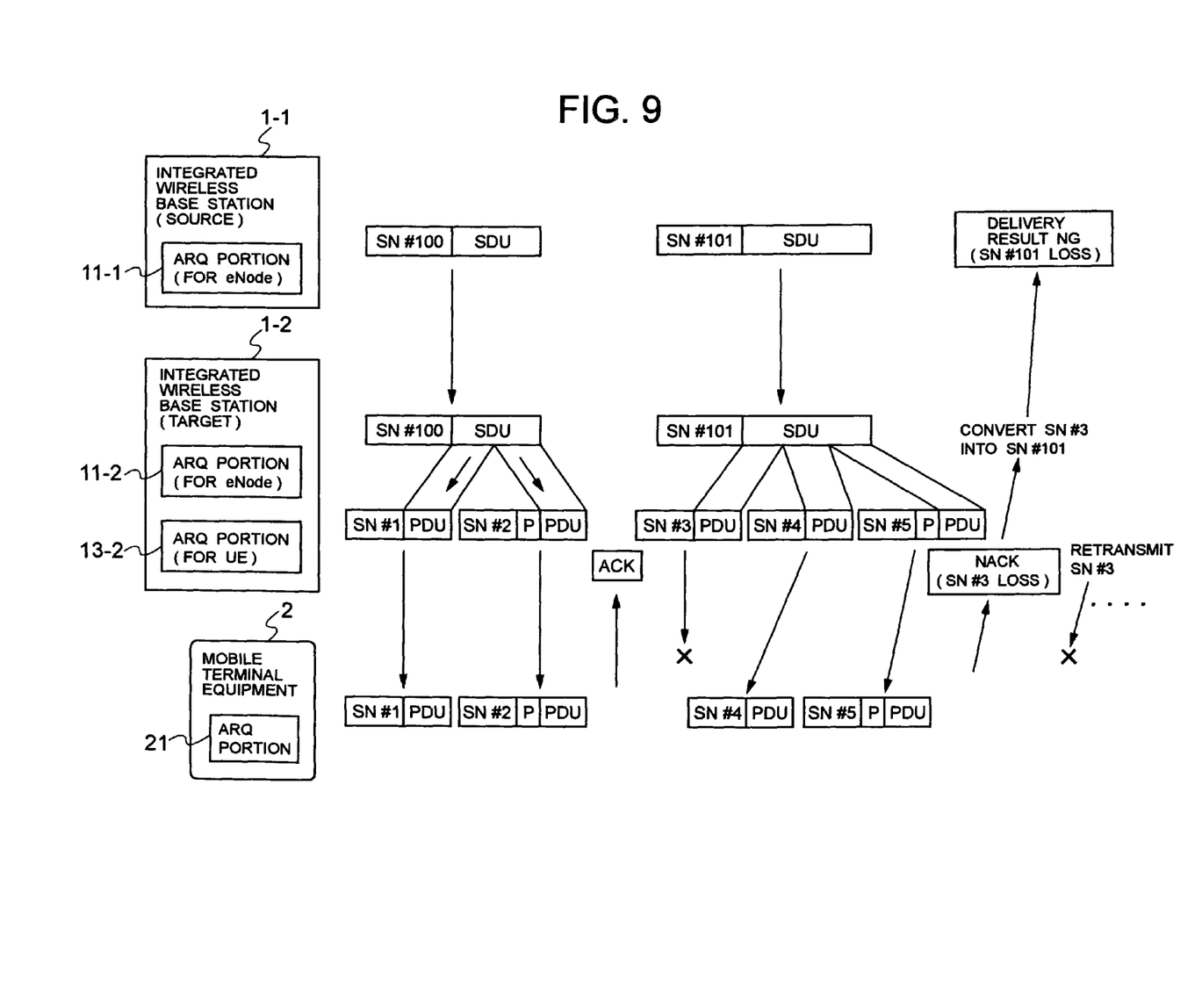
FIG. 9 is a view showing a transfer operation of user data according to an exemplary embodiment of the invention.

FIGS. 7 and 8 are sequence charts showing the operation of the mobile communication system according to an exemplary embodiment of the invention. FIG. 9 is a view showing a transfer operation of the user data according to an exemplary embodiment of the invention. Referring to FIGS. 1 to 9, the operation of the mobile communication system according to an exemplary embodiment of the invention will be described below.

The mobile terminal equipment 2 measures the received signal quality of a peripheral cell, and reports its result to the integrated wireless base station 1-1 (s1 of FIG. 7). The integrated wireless base station 1-1 decides the integrated wireless base station to make the hand over from the reported received signal quality (s2 of FIG. 7), and requests the decided integrated wireless base station 1-2 to set up a path for hand over (s3 of FIG. 7).

The integrated wireless base station 1-2 sets up the path within the node (s4 of FIG. 7), and transmits a path setting response (s5 of FIG. 7). The integrated wireless base station 1-1 receiving the path setting response transfers the user data to the integrated wireless base station 1-2 by appending the SN to the user data of SDU unit (s6 of FIG. 7), and instructs the mobile terminal equipment 2 to perform the hand over to the integrated wireless base station 1-2 (s8 of FIG. 7). At this time, the integrated wireless base station 1-1 holds the user data until receiving a delivery confirmation of the SDU that is transferred (s7 of FIG. 7).

The mobile terminal equipment 2 receiving a hand over execution instruction establishes a wireless resource with the integrated wireless base station 1-2 in the normal time (s9 of FIG. 7), transmits a hand over completion notification (s10 of FIG. 7), and receives the user data (s11 of FIG. 7).

However, if NG occurs at s11 during this hand over procedure, the integrated wireless base station 1-2 reports the transmission NG of the SDU, including the SN of the SDU that fails transmission to the mobile terminal equipment 2, to the integrated wireless base station 1-1 (s12 of FIG. 7).

The integrated wireless base station 1-1 receiving the transmission NG of the SDU starts a timer that waits for a reconnection request from the mobile terminal equipment 2 or a context request from another integrated wireless base station, while holding the SDU of transmission NG (s13 of FIG. 7). If this timer times out (expires), the integrated wireless base station 1-1 discards the SDU held in the accumulation portion 12-1.

Also, it is required that this timer value has a different value depending on the characteristic of service. For example, for an RT (Real Time) service such as a VoIP (Voice over Internet Protocol), the timer value is shorter, because there is less influence due to data loss but greater influence due to data delay, whereas for an NRT (Non Real Time) service such as FTP (File Transfer Protocol), the timer value is longer because there is greater influence due to data loss.

Thereafter, the mobile terminal equipment 2 searches a cell of the integrated wireless base station to be reconnected, establishes the wireless resource to the searched integrated wireless base station 1-3 (s14 of FIG. 7), and transmits a reconnection request (s15 of FIG. 7). This reconnection request includes an identification ID (Identifier) of the integrated wireless base station 1-1 on the source (Source) side. Herein, the mobile terminal equipment 2 holds the identifier of the integrated wireless base station 1-1 on the source side and the identifier of the integrated wireless base station 1-2, but appends the identifier of the integrated wireless base station 1-1 on the source side to the reconnection request, because the transmission NG occurs in the integrated wireless base station 1-2.

The integrated wireless base station 1-3 requests the integrated wireless base station 1-1 with the identifier to transfer the user data (s16 of FIG. 8). The integrated wireless base station 1-1 returns a user data transfer response (s17 of FIG. 8), and starts to transfer the SDU by appending the SN to the SDU that is undelivered (s18 of FIG. 8).

The integrated wireless base station 1-3 transmits a reconnection response to the mobile terminal equipment 2 (s19 of FIG. 8), transmits a path change request to the core network 100 (s20 of FIG. 8), receives the path change request from the core network 100 (s21 of FIG. 8), and transmits the SDU to the mobile terminal equipment 2 by dividing the transferred SDU into PDUs of transmission units on the wireless, and receives ACK of reception completion notification from the mobile terminal equipment 2 (s22 of FIG. 8).

The integrated wireless base station 1-3 confirms the transmission completion of all the SDUs transferred from the integrated wireless base station 1-1 and transmits a report of transmission completion (s23 of FIG. 8). The integrated wireless base station 1-1 discards the held SDU and clears the wait timer (s24 of FIG. 8). Also, the core network 100 transmits a path change response, and transmits a downstream user packet to the integrated wireless base station 1-3 (s25 of FIG. 8). The integrated wireless base station 1-3 transmits the downstream user packet to the mobile terminal equipment 2 (s26 of FIG. 8).

Referring to a flow of user data packet as shown in FIG. 9, the operation of each ARQ portion within the integrated wireless base station will be described below. In FIG. 9, the ARQ portion 11-1 intended for the integrated wireless base station in the integrated wireless base station 1-1 on the source (Source) side transmits the SDU with the SN appended to the ARQ portion 11-2 intended for the integrated wireless base station in the integrated wireless base station 1-2 on the target (Target) side. In this example, "#100" and "#101" are appended as the SN.

The ARQ portion 13-2 intended for the mobile terminal equipment in the integrated wireless base station 1-2 on the target side divides the SDU into the PDUs, appends the SN to the PDU, and transmits the PDU to the ARQ portion 21 of the mobile terminal equipment 2. In this example, the SN appended to the PDU is "#1", "#2", "#3", "#4" and "#5". The SN appended to the SDU and the SN appended to the PDU are different values as shown in this example.

The integrated wireless base station 1-2 on the target side holds the information of correspondence between the SN of the SDU and the SN of the PDU. In this example, "SDU_SN#100" corresponds to "PDU_SN#1" and "PDU_SN#2", and "SDU_SN#101" corresponds to "PDU_SN#3", "PDU_SN#4" and "PDU_SN#5". Also, "PDU_SN#2" and "PDU_SN#5" include "P", which is called Poll. "P" is appended in requesting the receiving side to transmit ACK or NACK, and appended to the last PDU for the SDU.

If the "SN#3" of the PDU transmitted from the ARQ portion 13-2 intended for the mobile terminal equipment becomes an error on the wireless, and does not arrive at the ARQ portion 21 of the mobile terminal equipment 2, the ARQ portion 21 of the mobile terminal equipment 2 transmits NACK indicating that the "SN#3" is undelivered to the ARQ portion 13-2 intended for the mobile terminal equipment.

The ARQ portion 13-2 intended for the mobile terminal equipment in the integrated wireless base station 1-2 on the target side that receives NACK retransmits PDU of "SN#3" by a prescribed number of times, but if ACK is not received, judges that the PDU of "SN#3" is transmission NG and reports that the "#101" that is the SN of corresponding SDU is undelivered via the ARQ portion 11-2 intended for the integrated wireless base station to the ARQ portion 11-1 intended for the integrated wireless base station in the integrated wireless base station 1-1 on the source side. Thereafter, the integrated wireless base station 1-1 on the source side performs the operation from step s13 in the procedure of FIG. 7.

An exemplary advantage according to the invention is that when the user data transferred between the integrated wireless base stations during hand over becomes an error on the wireless, the SN of the packet causing the error is notified between the integrated wireless base stations, whereby the communication can be resumed without losing the user data at the time of reconnection after hand over failure.

Also, an exemplary advantage according to the invention is that the user data is held in the integrated wireless base station on the source side until the user data transferred between the integrated wireless base stations during hand over arrives at the mobile terminal equipment, whereby even when the hand over failure or reconnection failure is repeated, the communication can be resumed without losing the user data until it is discarded with the timer.

Second exemplary embodiment of the invention has the same basic configuration as above, except that the number of integrated wireless base stations is not only 3 but also 4, 5, . . . , N, and the hand over process or the reconnection process is repeated over the integrated wireless base stations. Even in the case where the number of integrated wireless base stations is 4 or more as in this embodiment, the above process and effect are applicable.

Figure 10:
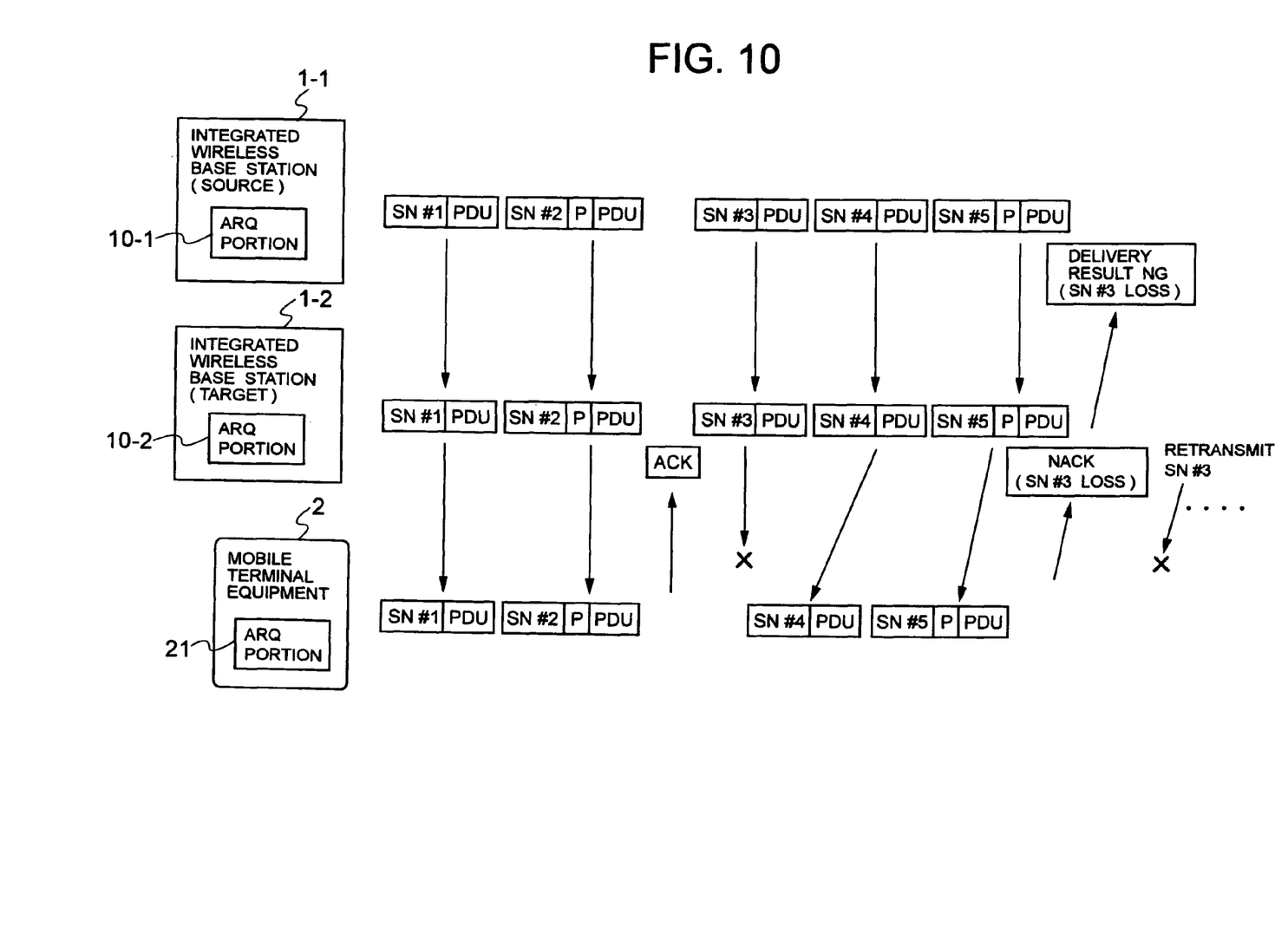
FIG. 10 is a view showing a transfer operation of user data according to third exemplary embodiment of the invention.

Also, third exemplary embodiment of the invention is a system in which the user data is transmitted not in SDU unit but in PDU unit between the integrated wireless base stations. This system is realized with one ARQ function without dividing the ARQ function within the integrated wireless base station into the ARQ function intended for the integrated wireless base station and the ARQ function intended for the mobile terminal equipment. Also, in this system, the transmission confirmation is enabled with only the SN of the PDU without properly using the SN of the SDU and the SN of the PDU. FIG. 10 shows a flow of user data packet in this embodiment.

Referring to FIG. 10, a difference from FIG. 9, the integrated wireless base station 1-2 on the target side receives NACK from the ARQ portion 21 of the mobile terminal equipment 2, retransmits the PDU of "SN#3" by a prescribed number of times, and if ACK is not received, judges that the PDU of "SN#3" is transmission NG, and directly reports that "SN#3" is undelivered to the integrated wireless base station 1-1 on the source side without converting the SN.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

What is claimed is:

1. A mobile communication system capable of transferring data to be sent to mobile terminal equipment from one wireless base station to another wireless base station during hand over, said mobile communication system comprising:
three or more base stations, the three or more base stations including a transfer source wireless base station, an initial transfer destination wireless base station and a secondary transfer destination wireless base station, the transfer source wireless base station including:
an accumulation portion that holds said data until said data normally arrives at said mobile terminal equipment,
wherein the initial transfer destination wireless base station of a transfer destination of said data receives a delivery confirmation response from said mobile terminal equipment and notifies a result of said delivery confirmation response to the transfer source wireless base station of a transfer source of said data, after transferring the data transmitted from the transfer source wireless base station data to said mobile terminal equipment, and
wherein the transfer source wireless base station transfers the data held in said accumulation portion to the secondary transfer destination wireless base station of an other transfer destination, to which said mobile terminal equipment makes a hand over, based on the result of said delivery confirmation response notified from the initial transfer destination wireless base station, and
wherein the transfer source wireless base station holds only the undelivered data in said accumulation portion, and restarts a timer for waiting for a reconnection request from said mobile terminal equipment and a connection request from the secondary transfer destination wireless base station when the data transferred to the initial transfer destination wireless base station is not delivered to said mobile terminal equipment.

2. The mobile communication system according to claim 1, wherein said timer freely varies the timer value in accordance with characteristics of a communication service for said mobile terminal equipment.

3. The mobile communication system according to claim 1, wherein the transfer source wireless base station transmits the user data held until said timer times out upon a transfer request of data from the secondary transfer destination wireless base station.

4. The mobile communication system according to claim 1, wherein the transfer source wireless base station comprises an integrated wireless base station integrated with a radio network controller.

5. The mobile communication system according to claim 1, wherein the data comprises data other than hand over data.

6. The mobile communication system according to claim 1, wherein the data comprises user data.

7. A wireless base station capable of transferring data to be sent to mobile terminal equipment to another wireless base station during hand over, comprising:
an accumulation portion that holds said data until said data normally arrives at said mobile terminal equipment in transferring said data to said another wireless base station,
wherein, the wireless base station is configured such that, an initial transfer destination wireless base station of a transfer destination of said data receives a delivery confirmation response from said mobile terminal equipment and notifies a result of said delivery confirmation response to the wireless base station, after transferring the data transmitted from the wireless base station to said mobile terminal equipment, the wireless wireless base station transfers the data held in said accumulation portion to a secondary transfer destination wireless base station of an other transfer destination, to which said mobile terminal equipment makes a hand over, based on the result of said delivery confirmation response notified from the initial transfer destination wireless base station, and wherein the transfer source wireless base station holds only the undelivered data in said accumulation portion, and restarts a timer for waiting for a reconnection request from said mobile terminal equipment and a connection request from the secondary transfer destination wireless base station when the data transferred to the initial transfer destination wireless base station is not delivered to said mobile terminal equipment.

8. The wireless base station according to claim 7, wherein a delivery confirmation response from said mobile terminal equipment notifies the result of said delivery confirmation response to said secondary transfer destination wireless base station, after transferring said data to said mobile terminal equipment, when said data is transferred from said secondary transfer destination wireless base station.

9. The wireless base station according to claim 7, wherein said timer freely varies the timer value in accordance with characteristics of a communication service for said mobile terminal equipment.

10. The wireless base station according to claim 7, wherein the wireless base station transmits the data held until said timer times out upon a transfer request of user data from the secondary transfer destination wireless base station.

11. The wireless base station according to claim 7, wherein the wireless base station comprises an integrated wireless base station integrated with a radio network controller.

12. A hand over reconnection method for use in a mobile communication system capable of transferring data to be sent to the mobile terminal equipment from one wireless base station to another during hand over, the method comprising:

holding said data in an accumulation portion by a transfer source wireless base station of a transfer source of said data until said data normally arrives at said mobile terminal equipment, wherein an initial transfer destination wireless base station of a transfer destination of said data receives a delivery confirmation response from said mobile terminal equipment and notifies a result of said delivery confirmation response to the transfer source wireless base station, after transferring the data transmitted from the transfer source wireless base station to said mobile terminal equipment, and wherein the transfer source wireless base station transfers the data held in said accumulation portion to a secondary transfer destination wireless base station, to which said mobile terminal equipment makes a hand over, based on the result of said delivery confirmation response notified from the initial transfer destination wireless base station, and wherein the transfer source wireless base station holds only the undelivered data in said accumulation portion, and restarts a timer for waiting for a reconnection request from said mobile terminal equipment and a connection request from the secondary transfer destination wireless base station when the data transferred to the initial transfer destination wireless base station is not delivered to said mobile terminal equipment.

13. The hand over reconnection method according to claim 12, wherein said time freely varies the timer value in accordance with characteristics of a communication service for said mobile terminal equipment.

14. The hand over reconnection method according to claim 12, wherein the transfer source wireless base station transmits the user data held until said timer times out upon a transfer request of user data from said secondary transfer destination wireless base station.

15. The hand over reconnection method according to claim 12, wherein the transfer source wireless base station comprises an integrated wireless base station integrated with a radio network controller.

16. The hand over reconnection method according to claim 12, wherein the mobile communication system includes three or more base stations.

17. A mobile communication system capable of transferring data to be sent to mobile terminal equipment from one wireless base station to another during hand over, the transfer source wireless base station of a transfer source of said data comprising:

accumulation means for holding said data until said data normally arrives at said mobile terminal equipment, wherein an initial transfer destination wireless base station of a transfer destination of said data receives a delivery confirmation response from said mobile terminal equipment and notifies a result of said delivery confirmation response to the transfer source wireless base station, after transferring the data transmitted from the transfer source wireless base station to said mobile terminal equipment, and wherein the transfer source wireless base station transfers the data held in said accumulation means to a secondary transfer destination wireless base station of an other transfer destination, to which said mobile terminal equipment makes a hand over, based on the result of said delivery confirmation response notified from the initial transfer destination wireless base station, and wherein the transfer source wireless base station holds only the undelivered data in said accumulation portion, and restarts a timer for waiting for a reconnection request from said mobile terminal equipment and a connection request from the secondary transfer destination wireless base station when the data transferred to the initial transfer destination wireless base station is not delivered to said mobile terminal equipment.

18. The mobile communication system according to claim 17, wherein the mobile communication system includes three or more base stations.

19. A wireless base station capable of transferring data to be sent to mobile terminal equipment to an initial transfer destination wireless base station of a transfer destination during hand over, the wireless base station comprising:

accumulation means for holding said data until said data normally arrives at said mobile terminal equipment in transferring said data to said initial transfer destination wireless base station, wherein, the initial transfer destination wireless base station receives a delivery confirmation response from said mobile terminal equipment and notifies the result of said delivery confirmation response to the wireless base station, after transferring the data transmitted from the wireless base station to said mobile terminal equipment, the wireless wireless base station transfers the data held in said accumulation means to a secondary transfer destination wireless base station of an other transfer destination, to which said mobile terminal equipment makes a hand over, based on the result of said delivery confirmation response notified from the initial transfer destination wireless base station, and wherein the transfer source wireless base station holds only the undelivered data in said accumulation portion, and restarts a timer for waiting for a reconnection request from said mobile terminal equipment and a connection request from the secondary transfer destination wireless base station when the data transferred to the initial transfer destination wireless base station is not delivered to said mobile terminal equipment.

* * * * *